United States Patent [19]

Broadbent

[11] Patent Number: 4,994,521

[45] Date of Patent: * Feb. 19, 1991

[54] PERSULFATE ACTIVATED AUTODEPOSITING COMPOSITION

[75] Inventor: Ronald W. Broadbent, Horsham, Pa.

[73] Assignee: Amchem Corporation, Ambler, Pa.

[*] Notice: The portion of the term of this patent subsequent to Jul. 19, 2005 has been disclaimed.

[21] Appl. No.: 220,457

[22] Filed: Jul. 18, 1988

Related U.S. Application Data

[63] Continuation-in-part of Ser. No. 544,450, Oct. 21, 1983, Pat. No. 4,758,621, which is a continuation of Ser. No. 327,677, Dec. 4, 1981, abandoned, which is a continuation-in-part of Ser. No. 102,834, Dec. 12, 1979, abandoned.

[51] Int. Cl.$^5$ ................................................ C08L 9/08

[52] U.S. Cl. ................................. 524/575; 148/270; 148/276; 106/1.05; 427/435

[58] Field of Search .................. 524/575; 148/62, 270, 148/276; 427/435; 106/1.05

[56] References Cited

U.S. PATENT DOCUMENTS 4,191,676  3/1980  Hall ..................................... 427/435

Primary Examiner—Joseph L. Schofer
Assistant Examiner—Peter Mulcahy
Attorney, Agent, or Firm—Ernest G. Szoke; Wayne C. Jaeschke; Alexis Barron

[57] ABSTRACT

An autodepositing coating composition for coating metallic surfaces comprising resin, persulfate, and optionally, fluoride, and having a pH of at least about 6.

12 Claims, No Drawings

PERSULFATE ACTIVATED AUTODEPOSITING COMPOSITION

CROSS-REFERENCE TO RELATED APPLICATIONS

This is a continuation-in-part of application Ser. No. 544,450, filed Oct. 21, 1983, now U.S. Pat. No. 4,758,621, which is a continuation of application Ser. No. 327,677, filed Dec. 4, 1981 (now abandoned), which is a continuation-in-part of application Ser. No. 102,834, filed Dec. 12, 1979 (now abandoned).

FIELD OF THE INVENTION

This invention relates generally to autodeposition and, more particularly, to an improved autodepositing composition which is effective in forming autodeposited coatings at neutral or near-neutral pH.

REPORTED DEVELOPMENTS

So-called "autodepositing coating" compositions, which first appeared in the patent literature in the early 1970's, are aqueous based compositions that are effective in forming on a metallic surface immersed therein an organic coating which increases in thickness as a function of the length of time the surface ("substrate") is immersed in the composition ("bath") in the absence of an externally-applied electrical potential. By way of illustration, autodepositing coating compositions and methods of autodeposition are disclosed in U.S. Pat. Nos. 3,585,084; 3,592,699; 3,776,848; 3,791,431; 3,795,546; 3,829,371; 3,839,097; 3,914,519; 3,936,546; 3,955,532; 3,960,610; 4,012,351; 4,030,945; 4,103,049; 4,104,424; 4,108,817; and 4,160,756. These patents disclose autodepositing compositions which are quite acidic, an exemplary pH range being about 1.6 to about 5 as disclosed in the aforementioned '756 patent. The aforementioned '084 patent discloses a preferred pH range of about 1.6 to about 3.8.

There are advantages associated with the use of a composition that would be less acidic than compositions of the aforementioned type. Such advantages include the ability to use in the composition materials such as resin, pigments, dyes, fillers and extenders which are acid-sensitive and thus cannot be used effectively in acidic compositions of the aforementioned type.

The present invention relates to an autodepositing composition which can be used to coat metallic surfaces at a relatively high pH.

SUMMARY OF THE INVENTION

The present invention relates to an aqueous autodepositing coating composition that is effective in coating ferrous surfaces at a pH of at least about 6. The composition comprises: (A) resin selected from the group consisting of water-soluble, water solubilized, water-dispersed and water-emulsified resins; and (B) dissolved persulfate; and preferably (C) dissolved fluoride. The fluoride constituent functions as an accelerator in the autodepositing process.

The present invention relates also to a method of forming an autodeposited coating on ferrous surfaces comprising immersing said surfaces in the above-described coating composition.

Although the theory behind the effectiveness of the present invention is not understood completely, it is thought that the persulfate ion functions to etch the substrate, thereby producing metal ions which destabilize the resin in the region of the substrate surface to produce an autodeposited coating. By virtue of the present invention, autodeposition can be achieved at a pH range heretofore thought impossible, that is, at neutral or near-neutral pH. The combination of persulfate and fluoride allows for the formation of greater coating thicknesses within shorter times than is experienced with compositions containing persulfate, but not fluoride.

DETAILED DESCRIPTION OF THE INVENTION

The composition of the present invention contains one or more water-soluble, water-solubilized, water-dispersed or water-emulsified organic coating forming resins. Such resins include the epoxy resins and polymeric film-forming materials such as polyethylene, polyacrylic and styrene-butadiene copolymers and polymers. By way of example, the epoxy resins (such EPON resins, products of Shell Chemical Co.) can be emulsified with toluene to produce a water-emulsified epoxy resin. A particularly useful class of resins is the resin dispersion class known as "latices" which includes, for example, the styrene-butadiene latex, DAREX 637, manufactured by W.R. Grace & Co., butyl latex, vinylidene chloride latex, vinyl acetate latex, and ethylene-vinyl acetate copolymer latex. A latex comprises resin solids dispersed in water.

The amount of resin utilized can vary over a wide range. The lower concentration limit is dictated by the amount of coating needed to provide sufficient material to form a coating. The upper limit is dictated by the amount of material that can be dispersed, dissolved or emulsified in the coating composition. Preferably, the composition contains from about 5 to about 550 (more preferably from about 50 to about 200) grams/liter of resin.

Persulfate is preferably added as a soluble salt thereof in an amount sufficient to provide from about 1 to about 20 grams/liter of persulfate in the coating composition. Preferably, the persulfate ion is added to the composition as ammonium persulfate in view of the fact that ammonium ion does not interfere with the coating process. In contrast, it has been found that other ions such as sodium and potassium ions can interfere with the autodepositing process for some latex resins, in which case, ion exchange or other means can be used to remove the potassium or sodium from the coating composition, as may be required.

Fluoride is added preferably as a soluble salt thereof in an amount at least sufficient to increase the rate at which the composition etches the surface of the metal being coated for example, a ferriferous surface. An amount of about 1 to about 10 grams/liter of fluoride in the coating composition is recommended. The fluoride is most preferably added to the composition as ammonium fluoride.

Fluoride acts as an accelerator for the persulfate thereby increasing the rate and amount of film build. In addition, its use results in an autodeposited film or coating that is found to be more cohesive when wet and more adhesive to the substrate than films formed from a persulfate-containing coating composition that does not contain fluoride. This increased cohesiveness when wet increases the resistance of a newly autodeposited film to physical disruption when water-rinsed.

The combination of fluoride and persulfate ion permits the use of lesser amounts of persulfate ion than are required in the absence of fluoride. Use of a lesser amount of persulfate ion appears to increase the corrosion resistance of the autodeposited film.

The coating composition of the present invention is employed at a preferred pH of from about 6 to about 8. While compositions may be employed to form coatings at a pH as high as about 8.5, there are many important advantages that are achieved by operation at neutral or near-neutral pH.

The rate of coating formation is higher and the cohesiveness of the film, and thus its ability to resist water rinsing, is higher when operating within the preferred pH range.

By operating within the pH range of about 6 to about 8, acid-sensitive dyes and pigments, including anti-corrosive pigments such as those manufactured by Halox Pigments, a division of Hammond Lead Products, Inc., may be used. The use of various dyes and pigments, including ones which are anticorrosive, results in autodeposited coatings that have improved corrosion resistance. In addition, lead chromate, which is an anticorrosive pigment, may be effectively employed.

Another advantage that can be realized by the practice of this invention at a neutral or near-neutral pH is that inorganic fillers and extenders which are acid-sensitive can be included in the composition. Calcium carbonate is an example of such a material.

Yet another advantage is that acid-sensitive resins or latices can be used. For example, resins which hydrolyze in acid medium can be used. Examples of such resins include vinyl ester polymers and vinyl ester copolymers such as vinyl acetate and ethylene-vinyl acetate copolymer.

Styrene-butadiene latices may be effectively employed at neutral or near-neutral pH.

Additional advantages to be realized by operating at neutral or near-neutral pH include the obvious health and safety benefits and the ability to use industrial equipment which is not highly acid-resistant.

The present composition may be formulated to have a pH within the range of about 6 to about 8 by adjusting the relative amounts of the essential ingredients. Therefore, it is not necessary to add to the composition any pH-adjusting compounds such as hydrochloric acid or sulfuric acid which are known to be detrimental to corrosion resistance. Such pH-adjusting agents may of course be added, but their use is generally not preferred. If such agents are used, it is preferred to adjust the pH by the addition of hydrofluoric acid or ammonium hydroxide since the addition thereof will not introduce ions to the solution which are deleterious to the effectiveness of the composition. It is generally preferred, however, that the compositions of the present invention be free of all such added pH-adjusting agents.

The substrate to be immersed in the present composition in order to autodeposit a coating thereon may be any ferriferous or zinciferous substrate such as, for example, cold-rolled steel, mild steel, iron, galvanized steel, and the like.

Substrates are coated according to the present invention by immersing the substrate to be coated in a bath of the present composition at a composition temperature of from about 20° to about 40° C. for a time sufficient to form an autodeposited coating thereon of the thickness desired. As is well known in the field of autodeposition, the coating weight for any particular coating composition and type of metal surface tends to increase as the time of immersion is increased. Generally, the time of immersion will vary from about 30 seconds or less to about 10 minutes or more.

Since the persulfate ion is known to decompose at a rate which increases with increasing temperature, the composition should be employed within the above-mentioned temperature range. It is preferred to employ the composition of the present invention at a temperature of from about 20° to about 30° C.

Other ingredients can be added in minor amounts to the present coating composition. Examples of such ingredients are coalescing agents (e.g., ethylene glycol monobutyl ether carbitol acetate), pH-adjusting agents such as those discussed above, and various dyes and pigments (including the preferred, above-mentioned anticorrosive pigments), such as titanium dioxide or AQUABLAK 115, a carbon black dispersion of Borden Chemical Co.

EXAMPLES

Examples which follow are illustrative of the invention. Comparative examples are set forth also.

EXAMPLE 1

The first group of examples is illustrative of autodepositing compositions having a neutral to near neutral pH and comprising dissolved persulfate, but no fluoride. These compositions were prepared by mixing DAREX 637 styrene-butadiene latex with deionized (D.I.) water and adding ammonium persulfate. The latex was diluted with water to the percent weight/volume solids specified in Table I below to make 1 liter of bath. To the 1 liter of bath was added ammonium persulfate in the amount specified in Table I to make autodepositing compositions.

Unpolished cold-rolled steel Q-panels (3"×4") were immersed for periods of 1 minute, 3 minutes or 5 minutes in the above compositions. After immersion in the compositions, the coating thicknesses ("film-build") were measured in mils. The results are given in Table 1 which follows.

TABLE 1

| Coating Composition | | | Substrate | |
|---|---|---|---|---|
| resin, % solids thickness weight/volume | ammonium persulfate (grams/liter) | pH | immersion time (minutes) | Coating (mils) |
| 5 | 3 | 6.92 | 1 | .05–.15 |
| 5 | 3 | 6.92 | 3 | .3–.4 |
| 5 | 3 | 6.92 | 5 | .45–.55 |
| 5 | 5 | 6.35 | 1 | .25–.35 |
| 5 | 5 | 6.35 | 3 | .50–.60 |
| 5 | 5 | 6.35 | 5 | .60–.70 |
| 20 | 3 | 7.47 | 1 | .10–.15 |
| 20 | 3 | 7.47 | 3 | .10–.20 |
| 20 | 3 | 7.47 | 5 | .20–.90 |
| 20 | 5 | 7.20 | 1 | .10 |
| 20 | 5 | 7.20 | 3 | .7–1.1 |
| 20 | 5 | 7.20 | 5 | 1.4–1.6 |

The results presented in Table 1 show that the film thickness that is achievable can vary considerably depending upon the substrate immersion time used, the percent resin solids used, and the quantity of ammonium persulfate used. It should be noted that a 5% weight/volume of resin solids using the DAREX 637 latex represents about 50 grams/liter resin solids. DAREX 637 latex includes an anionic surfactant, and the surfactant concentration of the latex is below the critical micelle concentration (CMC).

The addition of fluoride to compositions of the type referred to in Table 1 increases the etch rates of the compositions and the rates at which the compositions form coatings. This will be illustrated in examples which follow.

EXAMPLE 2

Autodepositing coating compositions were prepared from 180 grams of DAREX 637 latex and 5 grams AQUABLAK 115 (a carbon black pigment dispersion) which were placed in a 1 liter beaker. The resulting mixture was diluted with D.I. water to a volume of 1 liter.

To one liter samples of the above composition were added 2 g/l of ammonium persulfate (Composition A) and 2 g/l of ammonium persulfate and 7.5 g/l of $NH_4F$ (Composition B).

Unpolished cold-rolled steel Q-panels (3"×4") were immersed for 60 seconds in these compositions in order to determine the etch rate of substrate metal in mg/sq. ft. min. In addition, Q-panels were immersed for 90 seconds in each composition in order to determine coating thickness. The results are presented in Table 2 below.

TABLE 2

| Composition | pH of Composition | Etch Rate (mg./sq. ft-min) | Coating Thickness (mils for 90 sec. immersion) |
|---|---|---|---|
| A (persulfate only) | 7.65 | 8.8 | 0–0.5 |
| B (persulfate & F) | 7.2 | 18.6 | 0.6–0.7 |

From Table 2 above, it can be seen that, for a 90-second immersion, coating thickness was improved from 0–0.5 to 0.6–0.7 by the addition of the $NH_4F$. In another test, it was observed that Composition B was effective in forming a coating having a thickness of 0.5–0.6 mil on a Q-panel immersed therein for 60 seconds.

Another group of tests was run with "persulfate only" compositions like that of composition A above, but with increased amounts of persulfate, as indicated in Table 2A below.

TABLE 2A

| Comp | Ammonium Persulfate Added (g/l) | pH of Composition | Etch Rate (mg./sq.ft-min) | Coating Thickness (mils for 90 sec. immersion) |
|---|---|---|---|---|
| C | 3 | 7.49 | 18.8 | 0.5–0.6 |
| D | 4 | 7.35 | 18.4 | 0.5–0.6 |
| E | 5 | 7.22 | 25.2 | 0.7–0.8 |
| F | 6 | 7.05 | 26.0 | 0.8–1.0 |

The results as presented in Table 2A above show that both substrate metal etch rate and autodeposited coating thickness increased in direct proportion to the quantity of persulfate in the coating composition.

The next group of examples illustrates the formulation of an autodepositing composition and the formulation of compositions alike in all respects except for the substitution of an oxidizing agent for the persulfate constituent of the autodepositing composition. This group of examples illustrates also the effects achieved in efforts to coat 3"×4" ACT steel panels with the compositions.

Each of the compositions of this group of examples was prepared by mixing 185 g of DAREX 637 styrene-butadiene latex, 3 g of Aquablak 255 carbon black pigment dispersion and the oxidizing agent identified in Table 3 below and in the amount indicated. Sufficient deionized water was added to make 1 liter of each composition. The pH of each composition was measured and sufficient HF was added to the composition to adjust the pH to about 6, as indicated in Table 3. The molar amount of the oxidizing agent in each composition was the same namely 0.022 M.

Prior to treating the steel panels in the compositions, the panels were cleaned with an alkaline cleaning solution, rinsed with tap water and thereafter rinsed in D.I. water. Two sets of panels were treated in each of the compositions. Panels from one of the sets were immersed in the compositions for 1.5 minutes and panels from the other set were immersed in the composition for 3 minutes. After being withdrawn from the composition, the panels were air-dried for one minute, then dip-rinsed in tap water for 30 seconds and thereafter placed in an oven at 212° F. for 20 minutes to coalesce the coatings. The thicknesses of the cooled coatings were measured. The measurement values are reported in Table 3.

TABLE 3

| Ex. No. | Oxidizing Agent, g/l | pH | HF g/l | Coating Thickness in Mil 1.5 min | 3 min |
|---|---|---|---|---|---|
| 3 | $(NH_4)_2S_2O_8$, 5 g | 5.94 | 0.15 | 0.83 | 1.04 |
| C-1 | $H_2O_2$, 0.75 g | 5.99 | 0.17 | 0 | 0 |
| C-2 | $(NH_4)_2Cr_2O_7$, 5.5 g | 5.91 | –* | 0 | 0 |
| C-3 | $NH_4NO_3$, 1.8 g | 6.0 | 0.15 | 0.06 | 0.04 |
| C-4 | $NaBO_3 \cdot 4H_2O$, 3.4 g | 5.90 | 0.7 | 0 | 0 |
| C-5 | $KBrO_3$, 3.7 g | 5.97 | 0.16 | 0 | 0 |
| C-6 | $KMnO_4$, 3.5 g | 5.97 | 0.32 | 0.06 | 0.02 |

*Upon make-up of the composition, its pH was determined to be 5.91; accordingly, it was not necessary to add HF to adjust the pH of the composition.

The results reported in Table 3 above are evidence of the criticality of the use of persulfate in formulating the composition of the present invention relative to other oxidizing agents. Each of the oxidizing agents used in formulating the compositions of C-1 to C-6 is reported in the prior art as a constituent of the more highly acidic autodepositing compositions of the prior art. The test data of Table 3 shows the distinctly different results that are achieved using persulfate compared to other oxidizing agents.

In summary, it can be said that the present invention enables one to formulate a coating composition which is effective over a broad pH range, including a relatively high acidic pH, a neutral pH, and a basic pH. This in turn gives the user the advantage of being able to select from a wide variety of materials constituents that are particularly effective in the composition at the pH at which it is operated.

I claim:

1. An autodepositing coating composition having a pH of at least about 6 and comprising: (A) about 5 to about 550 g/l of dispersed resin solids; (B) about 1 to about 20 g/l of dissolved persulfate; and (C) dissolved fluoride in an amount at least sufficient to increase the rate at which the composition etches a ferriferous surface immersed therein.

2. An autodepositing coating composition having a pH of at least about 6 and comprising: (A) about 5 to about 550 g/l of dispersed resin solids; about 1 to about 20 g/l of dissolved persulfate; and (C) about 1 to about 10 g/l of dissolved fluoride.

3. A composition according to claim 1 or 2 having a pH of about 6 to about 8.

4. A composition according to claim 1 or 2 having a pH of no greater than about 8.5.

5. A composition according to claim 1 or 2 having a pH of about 7.

6. A composition according to claim 1 or 2 wherein the source of each of said persulfate and fluoride is the respective ammonium salt.

7. A composition according to claim 1 or 2 wherein the amount of resin solids is about 50 to about 200 g/l.

8. A composition according to claim 3 wherein the amount of resin solids is about 50 to about 200 g/l.

9. A composition according to claim 1 or 2 including an acid-sensitive material selected from the group consisting of resins, pigments, and fillers and a mixture of two or more of the aforementioned.

10. A method for coating a metallic surface comprising immersing the surface in a composition according to claim 1 or 2 for a sufficient period of time to form thereon a coating and thereafter withdrawing the coated surface from the composition.

11. A method according to claim 10 wherein said surface is a ferriferous surface.

12. A method according to claim 11 wherein said surface is a zinciferous surface.

* * * * *